United States Patent
Chen et al.

(10) Patent No.: US 7,477,895 B2
(45) Date of Patent: Jan. 13, 2009

(54) METHOD FOR DETERMINING REGISTRATION AREAS IN A WIRELESS COMMUNICATION SYSTEM

(75) Inventors: Meng-Seng Chen, Taipei (TW); Tzu-Wen Kuo, Taipei (TW); Yuh-Pyng Shieh, Taipei (TW)

(73) Assignee: Groundhog Technologies Inc., Cambridge ( * ) Notice: Subject to any disclaimer, the term of this patent is extended or adjusted under 35 U.S.C. 154(b) by 548 days.

(21) Appl. No.: 10/760,300

(22) Filed: Jan. 21, 2004

(65) Prior Publication Data

US 2005/0159155 A1    Jul. 21, 2005

(51) Int. Cl.
*H04Q 7/20* (2006.01)

(52) U.S. Cl. .................. 455/435.1; 455/422.1; 455/446

(58) Field of Classification Search ........................ None
See application file for complete search history.

(56) References Cited

U.S. PATENT DOCUMENTS

| | | | |
|---|---|---|---|
| 5,224,056 A | | 6/1993 | Chene et al. |
| 5,748,844 A | | 5/1998 | Marks |
| 6,091,953 A | | 7/2000 | Ho et al. |
| 6,137,783 A | | 10/2000 | Sallberg |
| 6,138,025 A | * | 10/2000 | Lee et al. .................. 455/453 |
| 6,160,804 A | | 12/2000 | Ahmed et al. |
| 6,249,252 B1 | | 6/2001 | Dupray |
| 6,385,454 B1 | | 5/2002 | Bahl et al. |
| 6,421,815 B1 | | 7/2002 | Seawright |
| 6,535,745 B1 | * | 3/2003 | Seraj ........................... 455/458 |
| 2004/0044979 A1 | * | 3/2004 | Aji et al. ....................... 716/13 |
| 2004/0165561 A1 | * | 8/2004 | Chiou et al. ................. 370/338 |

OTHER PUBLICATIONS

B.W. Kernighan and S. Lin, "An Efficient Heuristic Procedure for Partitioning Graphs," Bell System Technical Journal, vol. 49, Feb. 1970, pp. 291-307.

(Continued)

*Primary Examiner*—Lester Kincaid
*Assistant Examiner*—Shantell Heiber (57) ABSTRACT

A method for determining a plurality of location areas in a wireless communication system is disclosed. The method comprises the steps of determining a plurality of mobility data corresponding to a plurality of first partition units respectively and an overall cost of a plurality of first registration areas, wherein each of the first registration areas includes at least one of the first partition units; generating a plurality of second registration areas through a registration area determining procedure, wherein the second registration areas are constructed based on the mobility data of the first partition units; determining an overall cost of the second registration areas; comparing the overall cost of the first registration areas and the second registration areas; and determining a plurality of third registration areas and second partition units based on the result of comparison, wherein at least one of the second partition units is generated by combining at least two of the first partition units based on the mobility data of the corresponding first partition units when the overall cost of the first registration areas is lower than or equal to the overall cost of the second registration areas, at least one of the second partition units is generated by partitioning one of the first partition units based on the mobility data of the corresponding first partition units when the overall cost of the first registration areas is higher than the overall cost of the second registration areas.

9 Claims, 9 Drawing Sheets

OTHER PUBLICATIONS

C.M. Fiduccia and R.M. Mattheyses, A Linear Time Heuristic for Improving Network Partitions, in Proc. 19th IEEE Design Automation Conference, IEEE, 1982, pp. 175-181.

K. Lim and Y.H. Lee, "Optimal Partitioning of Heterogeneous Traffic Sources in Mobile Communications Network", IEEE Transactions on Computers, vol. 46, No. 3, Mar. 1997.

C.E. Ferreira, A. Martin, C.C. DeSouza, R. Weismantel & L.A. Wolsey, "The Node Capacitated Graph Partitioning Problem: A Computational Study", Mathematical Programming, vol. 81, pp. 229-256, 1998.

* cited by examiner

METHOD FOR DETERMINING REGISTRATION AREAS IN A WIRELESS COMMUNICATION SYSTEM

BACKGROUND OF THE INVENTION

1. Technical Field

The proposed invention relates generally to a mobility management method for use in a wireless communication system; and more particularly to a method for determining registration areas in a wireless communication system.

2. Related Art

There has been a very rapid growth in the number of service areas and subscribers in the wireless communications industry. The service requests (call attempts) received by mobile switching centers (MSC's) have been huge and kept growing especially in metropolitan areas. Therefore, mature and efficient Location (Mobility) Management plays a significant role in the regular operation of a wireless communication system.

Location (Mobility) Management is the procedure of keeping track of and locating mobile stations (MS's) in a wireless communication system so that calls arriving for them can be routed correctly to their current location. The purpose of Location (Mobility) Management is then to track the MS's using minimum overhead traffic. Since the radio bandwidth is a scarce resource in mobile radio communication systems, it's thus imperative to develop efficient techniques for minimizing this overhead traffic and thereby maximizing the revenue-generating traffic-carrying capacity of the system.

The MSC, though keeping track of MS's currently operating in its service area via a visitor location register (VLR) database, doesn't usually have accurate info as to the precise geographical location of each of the MS's within the service area. Consequently, when a call is initiated to a MS within the service area, a page must be broadcast over all cells in the service area. The paging message then has to be replicated a corresponding number of times and sent to each cell, but since there's only one cell in the system receiving a response from the MS, it means that a huge amount of radio bandwidth resources, thus additional costs, are over-wasted, which would otherwise be used for performing other tasks.

The conventional solutions to overcome this problem are to partition the service area of the wireless communication system into a plurality of registration areas (RA's), which are smaller than the service area. When a MS goes across the border of a RA and enters another RA, it will perform a location update (LU) indicating that it is operating within the newly entered RA. In this case, when a call is initiated to the MS, only the cells of that specific RA will be paged. But on the other hand, the number of LU's (with corresponding costs) will also be higher since the movements from one RA to another are more frequent. Therefore, a trade-off between paging and LU appears, and thus optimal RA formulation, i.e. the optimal determination of the boundaries (the location of borders between RA's) and the number of RA's are then very crucial.

Although the concept is caught and technically put into practice by the conventional methods, however, most of them actually just came up with a locally optimal solution, which will be explained in detail in the following paragraphs of the specification.

SUMMARY OF THE INVENTION

Therefore, there's an object of the present invention to provide a registration area determining method in which the registration areas are determined to reach global near-optimality, i.e. the capacity of any physical or virtual equipments optimized (maximized) globally (for example, paging load conformed to limited control channel resources systemwise), and the traffic (from any traffic sources) between cells (or LA's, etc.) globally optimized such that the overall cost of the wireless communication system can be minimized.

According to the object of the present invention, a method for determining a plurality of location areas in a wireless communication system is disclosed. The method comprises the steps of determining a plurality of mobility data corresponding to a plurality of first partition units respectively and an overall cost of a plurality of first registration areas, wherein each of the first registration areas includes at least one of the first partition units; generating a plurality of second registration areas through a registration area determining procedure, wherein the second registration areas are constructed based on the mobility data of the first partition units; determining an overall cost of the second registration areas; comparing the overall cost of the first registration areas and the second registration areas; and determining a plurality of third registration areas and second partition units based on the result of comparison, wherein at least one of the second partition units is generated by combining at least two of the first partition units based on the mobility data of the corresponding first partition units when the overall cost of the first registration areas is lower than or equal to the overall cost of the second registration areas, at least one of the second partition units is generated by partitioning one of the first partition units based on the mobility data of the corresponding first partition units when the overall cost of the first registration areas is higher than the overall cost of the second registration areas. Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
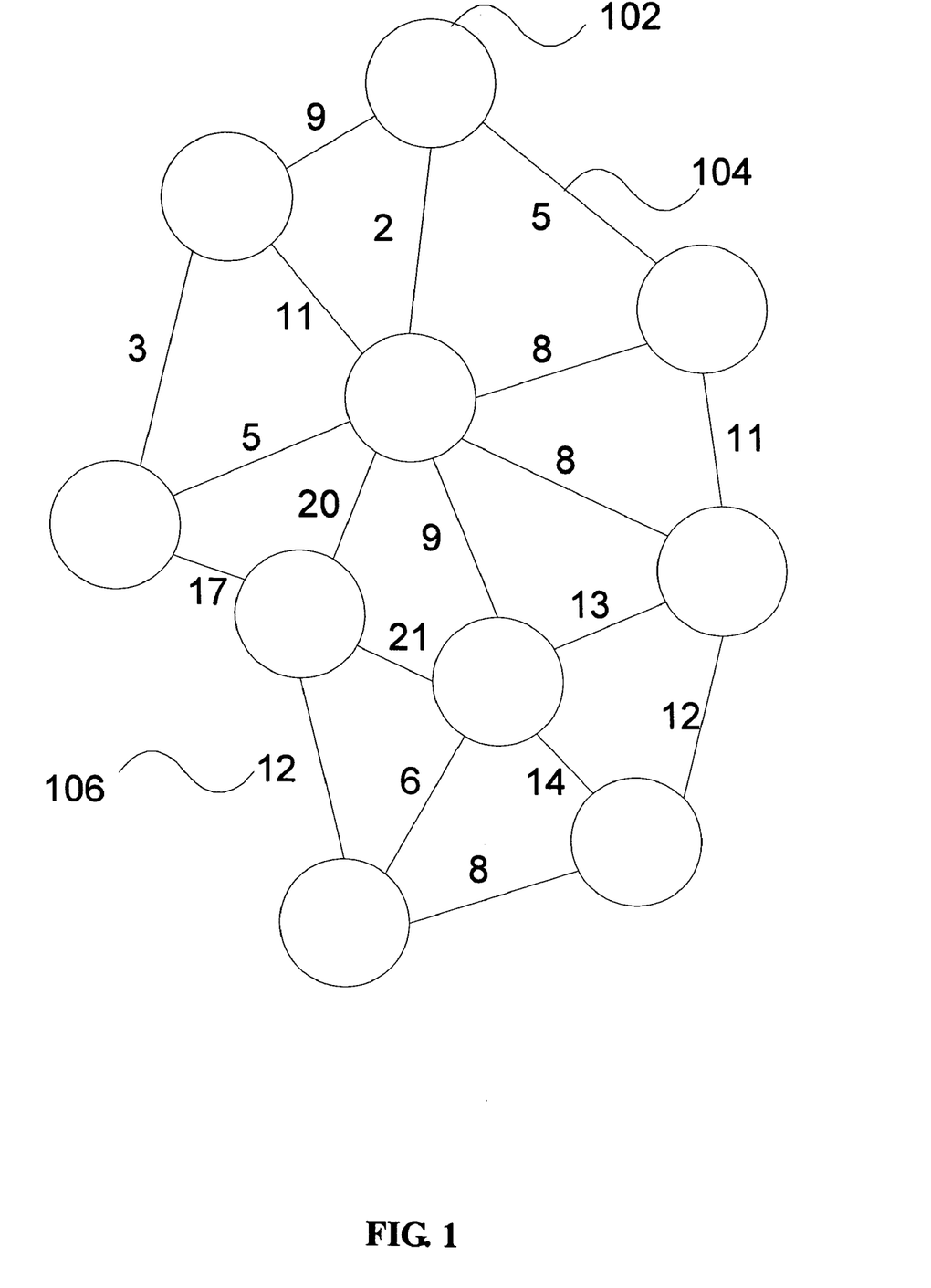
FIG. 1 shows a simplified diagram to represent a general mobility graph where each node represents any physical or virtual equipments with any type of capacity info provided, and each edge represents any traffic sources (with statistics) between the nodes.

The Mobility Management problem is very often developed in terms of a node-capacitated graph-partitioning problem. Cells are modeled as weighted modes and the edges between them represent the cell-crossing rate of MS's, as shown in FIG. 1. The problem involves partitioning nodes of this graph, which is referred to as "mobility graph" here, under capacity restriction on the sum of the node weights in each element of the partition (i.e. a registration area). Each element of the partition may be called as a "slot" of the partition.

In the present invention, a mobility graph such as FIG. 1 applies to general (node-capacitated) graph-partitioning scenarios where each node 102 represents any physical or virtual equipments with any type of capacity info provided, and each edge 104 comprises a plurality of mobility data at least including a plurality of mobility rates determined by any "traffic" sources (with statistics) 106 between the nodes, which might be generated from historical data, simulations or estimations, etc. Basically the objective is to minimize the sum of the cost, i.e. overall cost, of the edges (i.e. cell-crossing rate, registration traffic or any other traffic sources, etc.) between RA's. The problem of minimizing the radio access traffic (or any other traffic sources) with any capacity type corresponding to any physical or virtual equipments (such as paging traffic capacity) as an upper bound on the size of the RA is formulated.

Before getting to the details of the proposed invention, some terms used in the specification may be introduced and defined firstly: A partition unit (PU) is an element in a wireless communication system, usually a cell or a site (comprising 1 to 3 cells in regular circumstances), which is to be partitioned into RA's. A partition unit pool is a set of PU's. A PLAN is then a record of RA arrangements from a partition on the PU pool.

Figure 2:
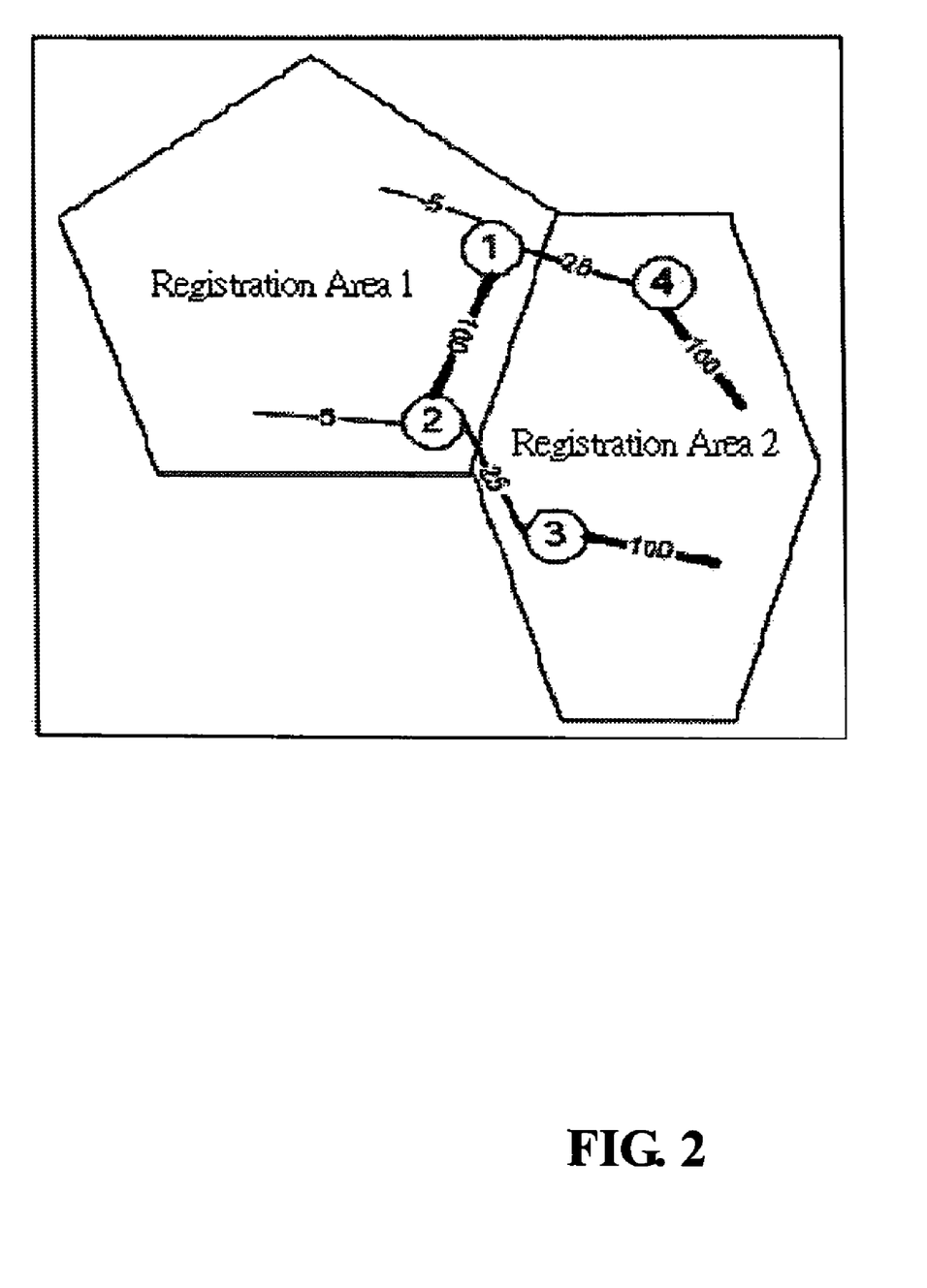
FIG. 2 is a diagram briefly showing one of the disadvantages of the conventional registration area partitioning methods.

FIG. 2 clearly exposes a situation of "local minimum" many RA-partitioning refining procedures are often trapped into. From the figure, we can easily check and see that, in the case of K-L/F-M algorithm, every PU belongs to its favorite RA. PU1 favors RA1 because of its "personal" consideration; on the other hand, PU2 also favors RA1 with the same reason. However, if PU2 joins RA2 instead, then PU1 will become to favor RA2 as well due to the action from PU2. It is reasonable that the current PU1 and PU2 can be grouped together as a new (and bigger) partition unit. This new PU will then favor RA2 now instead of RA1. Therefore, the new PU (including PU1 and PU2), which is called dynamic partition unit (DPU), should be moved or swapped to RA2 to bring a better partitioning result.

Most of the conventional RA-partitioning refining methods in this art (including K-L, F-M algorithm, or the modified) are basically a "micro-adjustment" algorithm, which is the reason why the conventional RA-partitioning refining methods are easily stuck into local minimum. There is indeed much a need in deriving a "macro-adjustment" algorithm when we deal with the above-mentioned problem. The idea is then to make the RA-partitioning refining method an "any-level-adjustment" algorithm by being able to dynamically setting the size and the boundary of the partition unit. So in the embodiment of the present invention, we call it "iterative RA-partitioning refining method with dynamic partition unit (DPU)" with the method being K-L or F-M algorithm, etc. Given a PU pool, a PLAN, a set of constraints and a LU cost evaluation function (generalizable to other evaluation functions from different traffic sources), the purpose is to produce a new plan satisfying the constraints with LU cost (or costs from other traffic sources) as low as possible.

Figure 3:
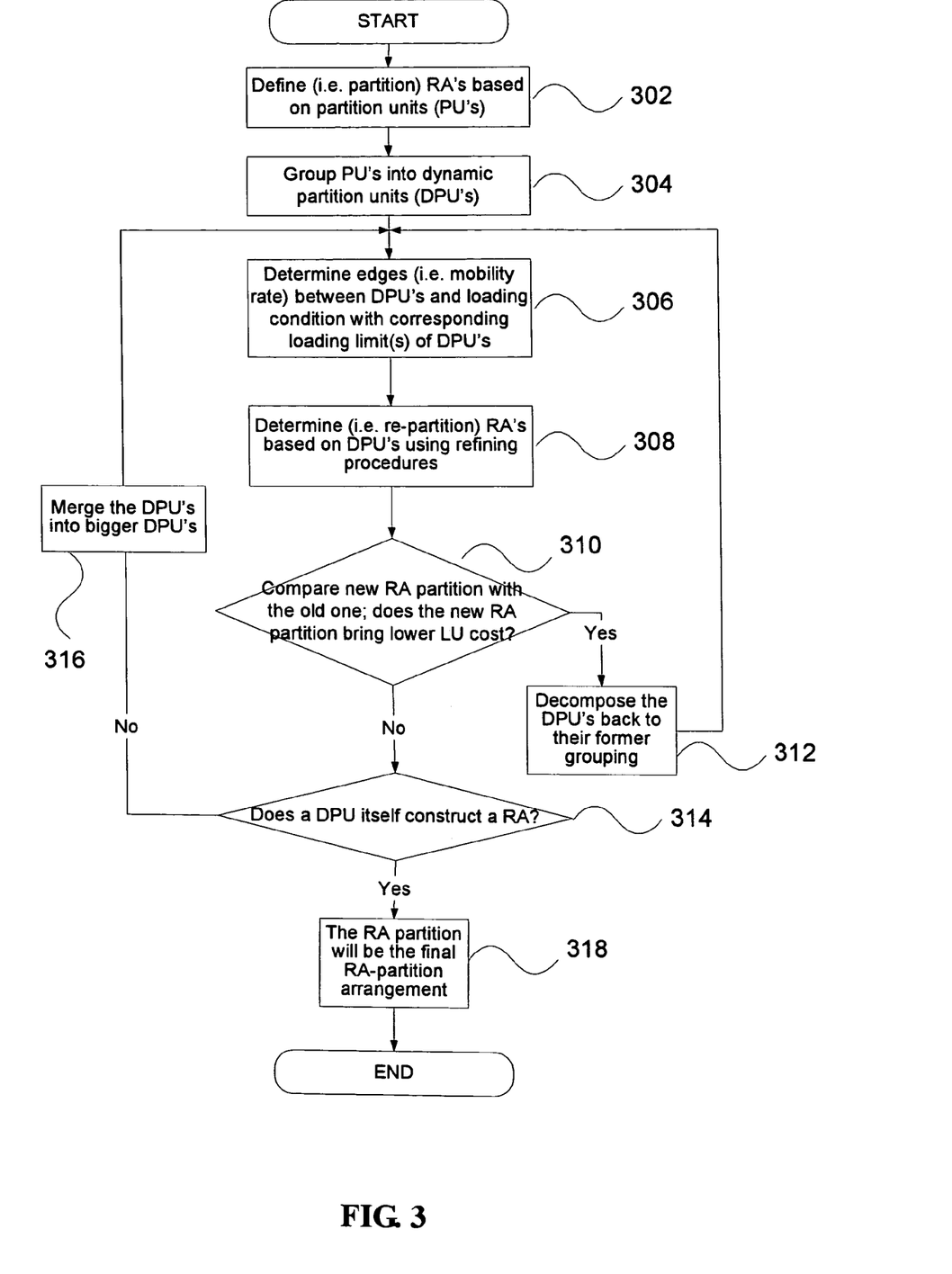
FIG. 3 is a flow chart illustrating the operation of the registration area partitioning method according to the embodiment of the present invention.

The detailed procedures of the flow of the proposed invention are organized in FIG. 3 and each corresponding description will be done as follows. Before that, again, some further definitions are built up. First, as just put forth, a dynamic partition unit (DPU) is a PU or a set of DPU's. Each DPU can form a tree structure with DPU's as internal nodes and PU's as leaf nodes. Properties of a DPU can be analogized from the set of PU's it contains, for example, the paging rate of a DPU is the sum of that of its containing set of PU's. (So it should be noted that DPU and PU will be brought up interchangeably throughout.) Second, a dynamic registration area (DRA) comprises a set of DPU's. A DPU pool (DPOOL) is a set of DPU's and a "layer" is a DPU pool. Third, a DPLAN with respect to a layer is a set of DRA's that forms a partition on the layer (DPU pool).

In the beginning, step 302: Define (i.e. partition) RA's based on partition units (PU's), is executed. It may either come from the original design of RA partition, or start from the circumstance that a cell/site is itself a RA and that further refining is to be done. After that, operation proceeds to step 304, which is the grouping of PU's into DPU's. In other words, since originally a target problem with PU pool and PLAN input is confronted, they have to be transformed to DPU pool and DPLAN by constructing each DPU to represent each PU.

What follows above is step 306, which is to determine the edges comprising a plurality of mobility data and represented by a plurality of mobility rates, which can be determined by a plurality of traffic sources in a service area of a wireless communication system from historical data, simulations or estimations, etc. It is also to determine the loading condition of the DPU's which fits corresponding loading limit(s) including a plurality of constraints with respect to any physical or virtual equipments in the wireless communication system.

The operation then proceeds to the activation and performance of a RA-partitioning refining method such as K-L, F-M algorithm, or any other "local-minimum tracking procedures" in step 308 to generate better DRA partitioning and better boundaries between the DRA's. What follows is step 310 posting the question: Does the new RA partition bring lower LU cost after comparing it with the old RA partition? If the new RA partition brings lower LU cost (Yes to step 310), then elements (DPU's) of DRA's will be decomposed in step 312 from DPLAN back to their former grouping and the process will loop back to the execution of step 306 and keep running. On the other hand, if the new RA partition doesn't bring lower LU cost after comparing it with the old RA partition, then the proposed algorithm will check if here a DPU itself actually constructs a RA in step 314, or say if a slot, RA, contains only one "top-level" DPU, which means that the DPU is not contained by another DPU. If so, it means that no more merging of DPU's is possible and sensible, so the resulting RA partition will just be the final RA-partition arrangement 318 and the whole algorithm will come to an end; if not, the DPU's will be merged into bigger DPU's in step 316 and the process will loop back to step 306 and keep running until the merging procedure can not any be done (i.e. again, a DPU itself constructs a RA), and so on.

In other words, basically the algorithm is that given a graph partition refining problem (GPRP), the K-L, F-M algorithm or any other related algorithm is run on it, say, $GPRP_k$ (starting from k=0) and get $GPRP_k'$ (step 308). If any of the methods is effective, then go "upstairs" (step 316) to get a super GPRP, $GPRP_{k+1}$, from $GPRP_k'$, otherwise go "downstairs" (step 312) to $GPRP_{k-1}'$. Here "upstairs" is defined as the action constructing a super GPRP from a GPRP and "downstairs" is defined as the action restoring a GPRP from a super GPRP. It should be noted that given a GPRP, there may be many super GPRP's. The upstairs action is then a nondeterministic action, but the downstairs action, on the other hand, is a deterministic action. So the upstairs action is executed by randomly choosing one super GPRP from all possible candidates, and the downstairs action is executed by just restoring the graph to its previous one.

This algorithm is run recursively. If in the process of adjustment, there are good effects generated (i.e. lower LU cost produced), then a finer adjustment is executed, otherwise a rougher adjustment is executed. The important thing here to be noticed is on two boundary conditions. One is that downstairs cannot be executed to $GPRP_{-1}$, so under this condition, naturally the same GPRP is used and go to step 306. The other is that if a DPU itself constructs a RA already, the operation ends then.

Figure 4:
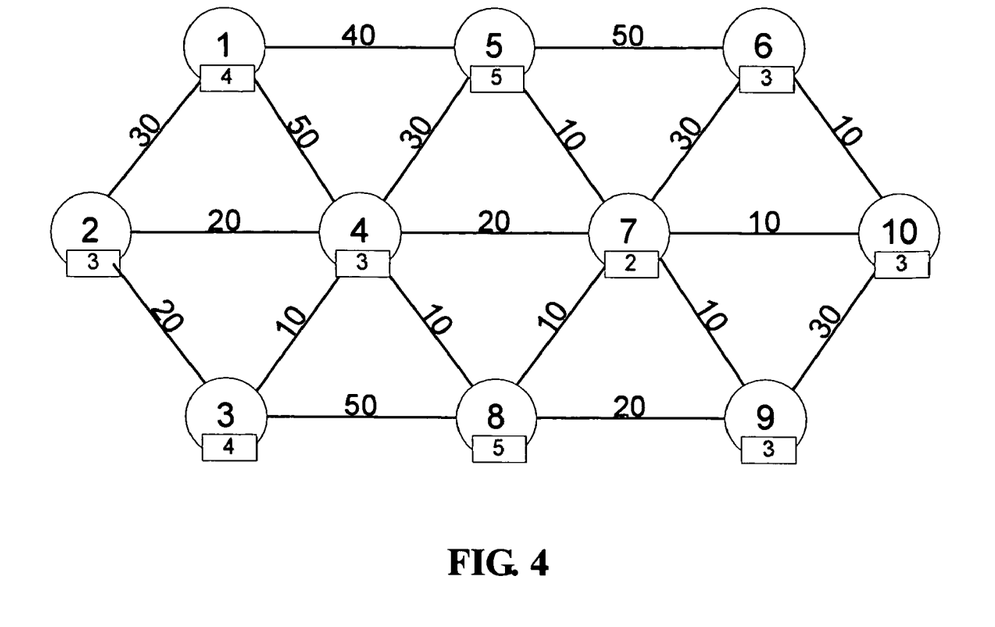
FIG. 4~FIG. 14 help illustrate the proposed method (procedure) step by step in an example according to the embodiment of the present invention.

Here an example is given to illustrate the proposed method (procedure). Given a network topology as follows, with a paging load limit of 18, the goal is to find a partition on network with as low location update traffic as possible between slots of the partition but that total paging traffic in each slot of the partition is lower than the load limit 18. In the network topology, each node represents an equipment (physical or virtual), each label attaching on a node represents the paging traffic load of the equipment, and each number attaching on a link represents the location update traffic between two equipments. Please refer to FIG. 4.

Figure 5:
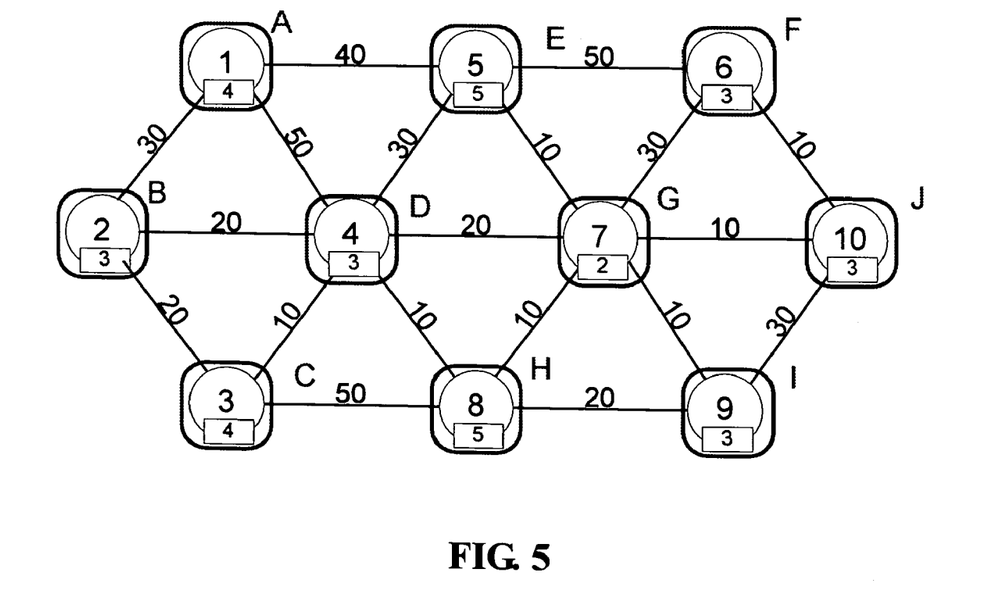

At Step 302, a partition on this network is defined by an arbitrary partition, a random partition, or an output partition of some partition refining procedure first. In this example, a primitive partition where each node is taken as a slot of the partition is used. English alphabets are used here to denote slots of the partition. Please refer to FIG. 5.

Figure 6:
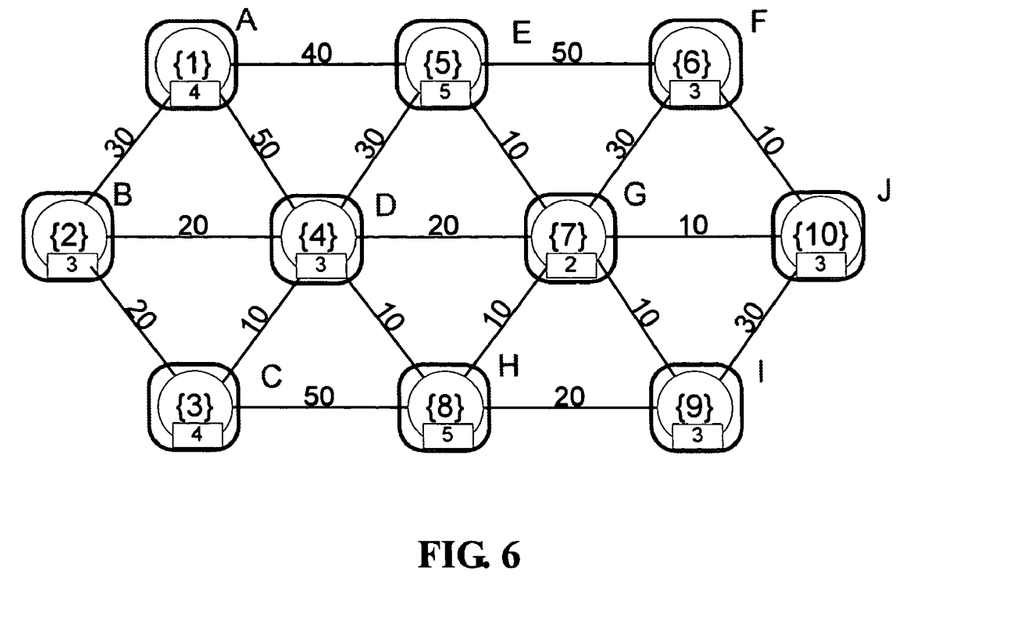

At Step 304, each node is considered as a partition unit. A dynamic partition unit can be seen as a set of partition units or a set of dynamic partition units. So each partition unit is transferred to a dynamic partition unit. At Step 306, since partition units are just transferred to dynamic partition units, the paging data and location update data have to be rebuilt. Please refer to FIG. 6.

Figure 7:
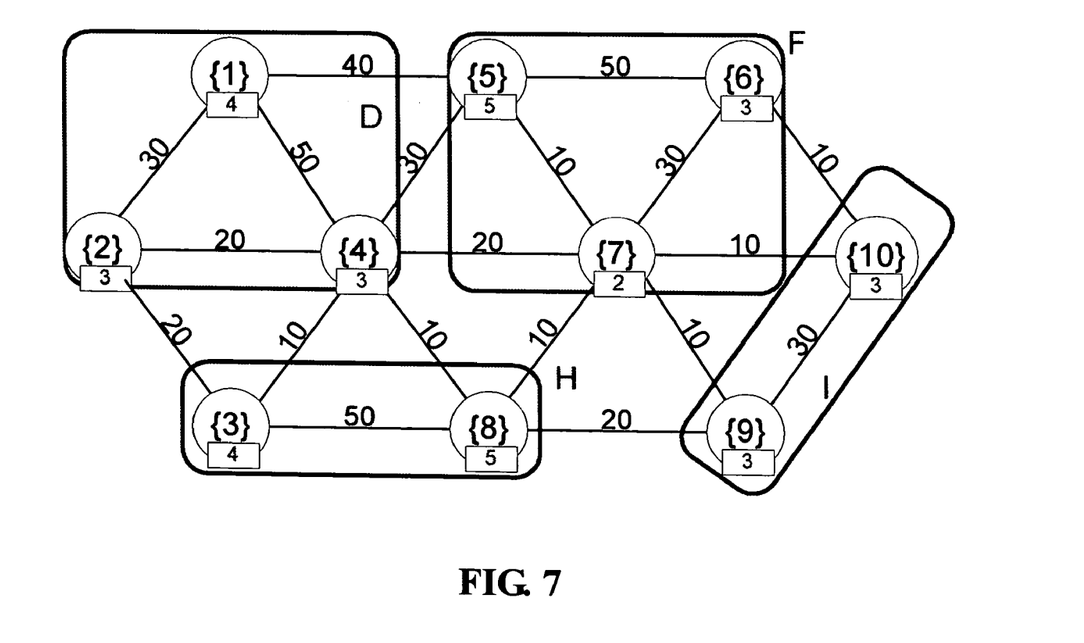

At Step 308, an arbitrary refining procedure can be run. Here a K-L/F-M-based algorithm is used. First, a random node sequence: {1} {5} {6} {2} {4} {7} {10} {3} {8} {9} is assigned. Under this processing order, nodes are put together if this is good for minimizing inter-slots location update traffic. For example, considering node {1}, node {1} will be pushed to slot D, because pushing node {1} to slot D can make a lower cost by 50, and is better than pushing node {1} to slot B or E. Considering node {2}, when having two nodes {1} and {4} in slot D, {2} will be pushed to slot D and get a lower cost by 50. Finally the following moves are determined in the same way. Now the LU cost is 190. Please refer to FIG. 7.

At Step 310, since the refining procedure has truly changed the partition topology and got a lower LU cost from Step 308, Step 312 is executed. At Step 312, originally dynamic partition units have to be decomposed, but there is nothing to decompose because each dynamic partition unit contains only one partition unit. Then the process loops back to Step 306. Again, since there is nothing changed, the Step 306 is skipped to go to Step 308.

At Step 308, another random sequence is generated: {5} {7} {6} {10} {8} {1} {4} {3} {2} {9}. Using this sequence, we run the K-L/F-M-based procedure. In this turn, there is nothing changed, which means that all nodes are stable. The solution is obviously trapped into a local minimum. Now the LU cost is 190. At Step 310, since a lower LU cost cannot be gotten through Step 308, Step 314 is executed. At Step 314, since not every slot contains only one top-level DPU, Step 316 is executed.

Figure 8:
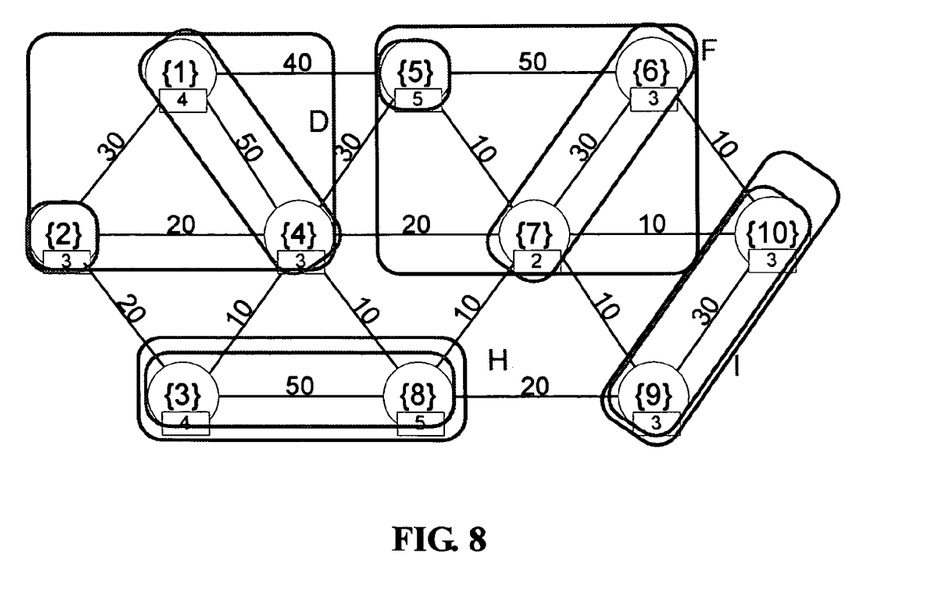

At Step 316, dynamic partition units are to be merged into bigger ones. Since each bigger DPU must be included in some partition slot, only DPU's in the same slot can be merged. Still another random sequence: {1} {2} {3} {8} {9} {7} {10} {4} {5} {6} is gotten. Under this sequence, when node {1} is considered, node {1} and node {4} are merged just because between {2} and {4} (in the same slot with node {1}), node {4} has the biggest LU cost with node {1}. When node {2} is considered, since node {1} and node {4} are processed already, node {2} can not be merged with anyone. Please refer to FIG. 8.

Figure 9:
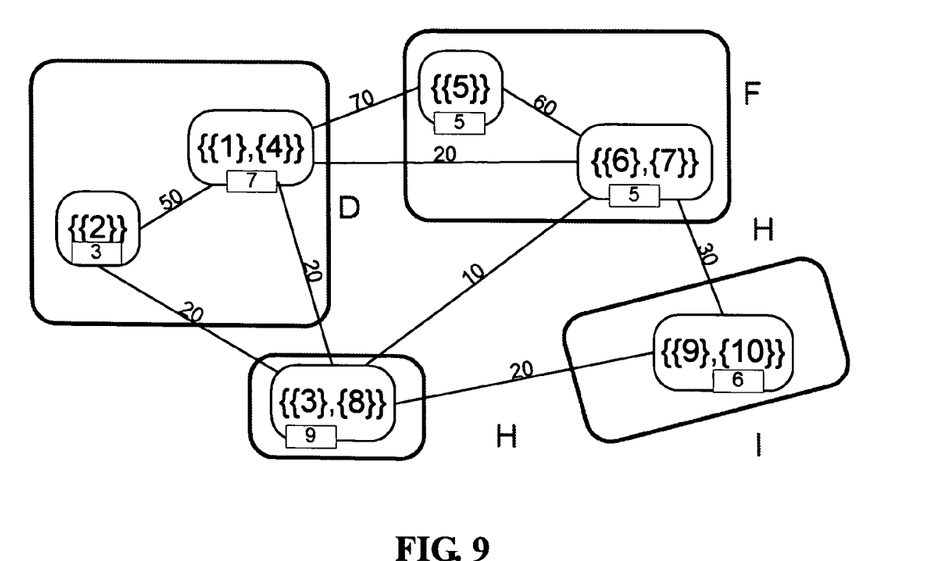

With the process looping back at Step 306, the paging traffic and LU traffic for each bigger dynamic partition units have to be recalculated. Please refer to FIG. 9.

Figure 10:
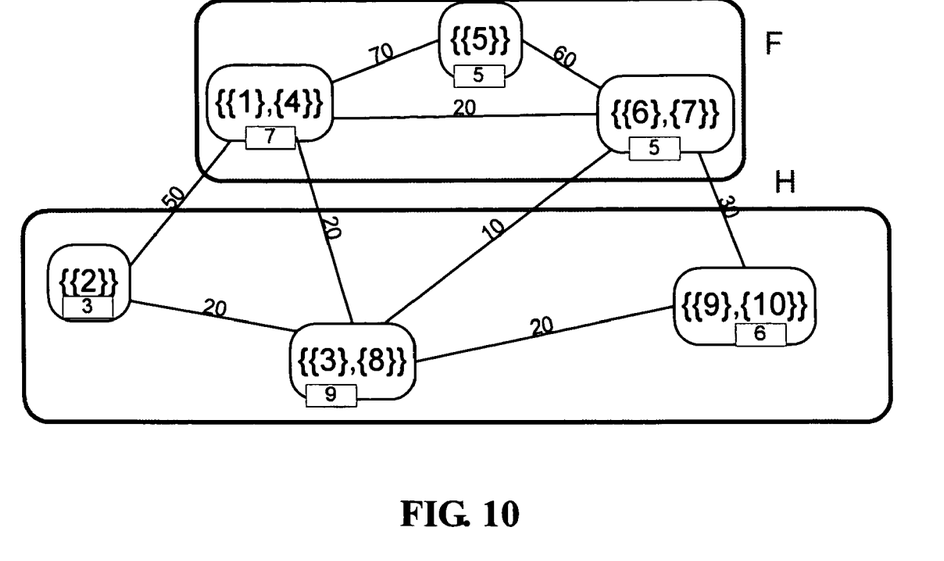

At Step 308, another random sequence is gotten: {{1}, {4}} {{5}} {{6}, {7}} {{2}} {{3}, {8}} {{9}, {10}}. Under this sequence, considering node {{1}, {4}}, pushing it to slot F gets a lower LU cost. Consider node {{2}}, when slot F contains nodes {{1}, {4}}, {{6}, {7}}, {{5}}, pushing node {{2}} to slot F can get a lower LU cost, but this action will pull up the paging load of F to 20 which exceeds the load limit constraint 18. So node {{2}} is pushed to slot H instead. Please refer to FIG. 10 to see the result of Step 308.

Figure 11:
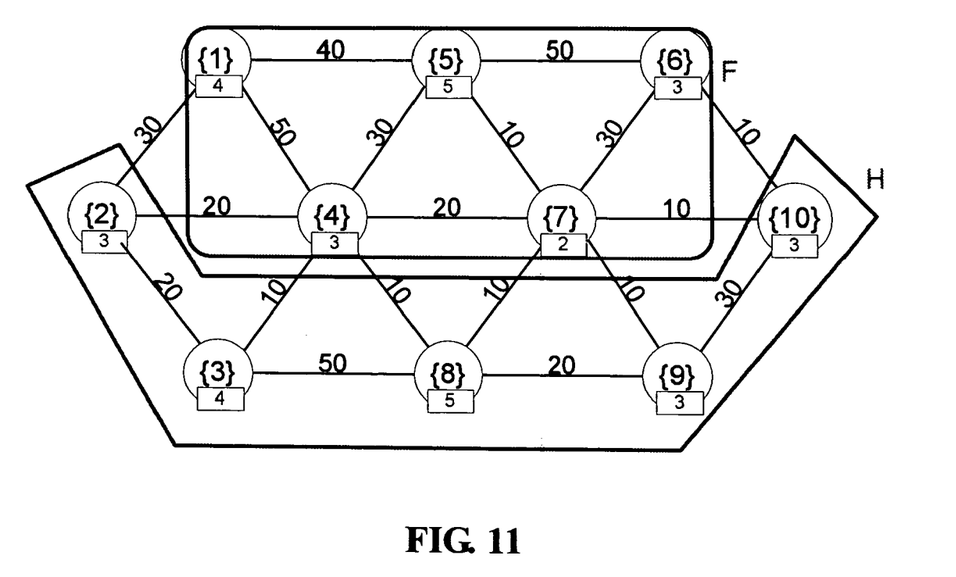

At Step 310, since lower LU cost is gotten at Step 308, Step 312 is executed to return to the previous network topology, and get FIG. 11.

Figure 12:
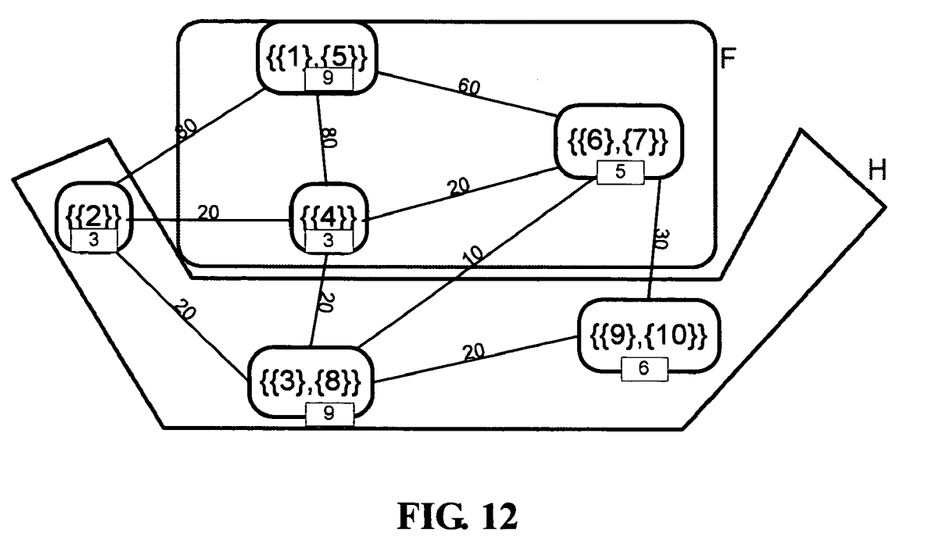

With the process looping back at Step 306, the original paging load and LU traffic data will be recovered. At Step 308, K-L/F-M is run, but nothing is changed because the total paging loads of slot F and H are close to paging load limit 18. At Step 310, since lower LU cost cannot be gotten, Step 314 is executed. At Step 314, not every slot contains only one top-level DPU, so go to Step 316. At Step 316, another random sequence is gotten: {7} {9} {3} {8} {2} {6} {5} {1} {10} {4}. Under this sequence, the merging procedure is run again. Then at Step 306, paging loads and LU traffic are calculated. Please refer to FIG. 12.

Figure 13:
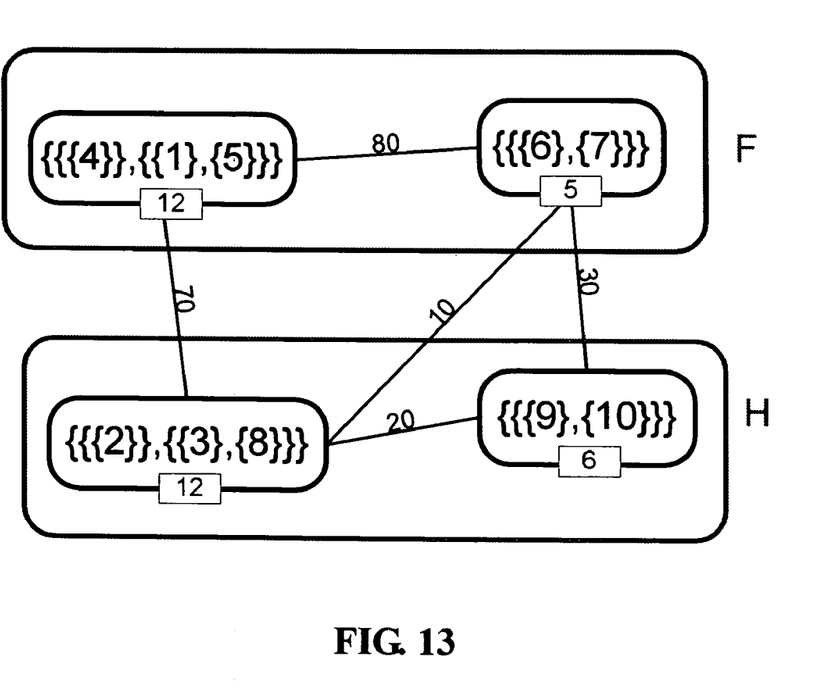

At Step 308, K-L/F-M is run, but nothing is changed. At Step 310, since there is nothing changed at Step 308, Step 314 is executed. At Step 314, not every slot contains only one top-level DPU, so go to Step 316. At Step 316, another random sequence is gotten: {{2}} {{3}, {8}} {{1}, {5}} {{6}, {7}} {{9}, {10}} {{4}}. Under this sequence, the merging procedure is run again. With the process looping back at Step 306, the paging loads and LU traffic are calculated again. Please refer to FIG. 13.

Figure 14:
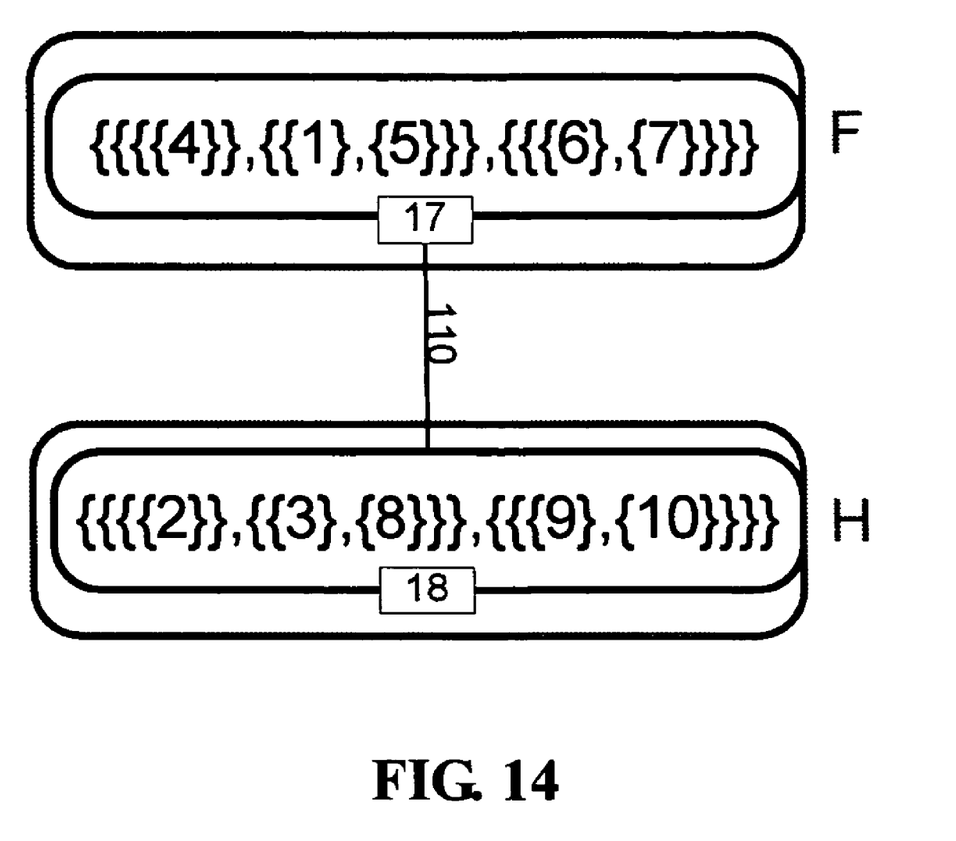

At Step 308, K-L/F-M is run, but nothing is changed. At Step 310, since there is nothing changed at Step 308, Step 314 is executed. At Step 314, not every slot contains only one top-level DPU, so go to Step 316. At Step 316, another random sequence is gotten: {{{9}, {10}}} {{{4}}, {{1}, {5}}} {{{2}}, {{3}, {8}}} {{{6}, {7}}}. Under this sequence, the merging procedure is run. At Step 306 again, the paging loads and LU traffic are calculated. Please refer to FIG. 14.

At Step 308, K-L/F-M is run, but nothing is changed. At Step 310, since there is nothing changed at Step 308, Step 314 is executed. At Step 314, since both F and H contain only one top-level DPU, so Step 318 is executed. Slot F and H are to be the final partition P={F, H}={{4, 1, 5, 6, 7}, {2, 3, 8, 9, 10}}.

It should be noticed that the method disclosed in the embodiment of the present invention is for use in all different kinds of wireless communication systems, including not only the second generation wireless networks such as GSM, CDMA and PDC, but also more advanced systems such as 2.5 G systems like GPRS and EDGE, 3G systems like UMTS/WCDMA, CDMA2000 and TD-SCDMA, and other wireless communication systems such as PHS and Wireless LAN/IPv6 networks. The terms used in different systems may be different but the concept is similar. When it comes to the addressed representative registration area (RA) partitioning refining method with DPU, the concept of the registration area (RA) just covers the location area (LA) of GSM system, the routing area (also RA) of packet-switched or 3 G systems, registration location area (RLA)/overlapping location area (OLA) and paging area of PDC and PHS, cell area (CA) of 3 G systems, as well as UTRAN Registration Area of UMTS/WCDMA.

While the invention has been described by way of an example and in terms of a preferred embodiment, it is to be understood that the invention is not limited thereto. On the contrary, it is intended to cover various modifications, similar arrangements and procedures, and the scope of the appended claims therefore should be accorded the broadest interpretation so as to encompass all such modifications, similar arrangements and procedures.

What is claimed is:

1. A method for determining a plurality of registration areas in a wireless communication system, wherein the wireless communication system comprises a plurality of first registration areas, and each of the first registration areas comprises at least one of a plurality of first partition units, the method comprising the steps of:

performing a registration area determining procedure according to a plurality of mobility data corresponding to the first partition units to determine a plurality of second registration areas, wherein each of the second registration areas comprises at least one of the first partition units;

comparing an overall cost of the first registration areas with an overall cost of the second registration areas;

determining a plurality of second partition units, including a dynamic partition unit, and a plurality of mobility data corresponding to the second partition units and the dynamic partition unit according to the result of comparison, wherein at least the dynamic partition unit is generated by combining at least two of the first partition units when the overall cost of the first registration areas is lower than or equal to the overall cost of the second registration areas, and at least the dynamic partition unit is generated by partitioning one of the first partition units when the overall cost of the first registration areas is higher than the overall cost of the second registration areas; and performing the registration area determining procedure according to the mobility data corresponding to the second partition units and the dynamic partition unit to determine a plurality of third registration areas, wherein each of the third registration areas comprises at least one of the second partition units, and one of the third registration areas includes the dynamic partition unit.

2. The method of claim 1, wherein the method is executed recursively until a plurality of $(n+1)^{th}$ registration areas and $n^{th}$ partition units are determined that each of the $(n+1)^{th}$ registration areas includes only one $n^{th}$ partition unit and the overall cost of the $(n)^{th}$ registration areas is smaller than or equal to the overall cost of the $(n+1)^{th}$ registration areas.

3. The method of claim 1, wherein the mobility data at least include a plurality of mobility rates.

4. The method of claim 3, wherein the mobility rates are determined by a plurality of traffic sources in the wireless communication system through at least one of the following operations which are gathering historical data, simulation and estimation.

5. The method of claim 1, wherein the second partition units are determined based on a plurality of loading limits of the wireless communication system.

6. The method of claim 5, wherein the loading limits at least include a plurality of constraints corresponding to any physical or virtual equipments in the wireless communication system.

7. The method of claim 1, wherein the registration area determining procedure is at least one of the K-L algorithm and the F-M algorithm.

8. The method of claim 1, wherein the registration area is determined by at least one of the following: a location area (LA) of a GSM system, a routing area (RA) of a packet-switched or a 3 G systems, a registration location area (RLA)/overlapping location area (OLA) and a paging area of a PDC and a PHS system, a cell area (CA) of a 3 G systems, and an UTRAN Registration Area of a UMTS/WCDMA system.

9. The method of claim 1, wherein when the first partition units are non-partitionable, generating the second partition units by combining at least two of the first partition units is performed.

* * * * *